United States Patent [19]
Bathla

[11] Patent Number: 5,390,732
[45] Date of Patent: Feb. 21, 1995

[54] CLAMPING APPARATUS AND METHOD FOR HEAT EXCHANGER PLATES

[75] Inventor: Pritam S. Bathla, Beaver Creek, Ohio

[73] Assignee: Chrysler Corporation, Highland Park, Mich.

[21] Appl. No.: 194,955

[22] Filed: Feb. 14, 1994

[51] Int. Cl.6 ............................................. F28D 1/02
[52] U.S. Cl. .................................... 165/153; 165/166; 29/890.043; 29/890.054
[58] Field of Search ................. 29/890.043, 890.053, 29/890.054; 165/152, 153, 166

[56] References Cited

U.S. PATENT DOCUMENTS

| | | | |
|---|---|---|---|
| 2,191,631 | 2/1940 | Shutts et al. | 29/890.043 |
| 2,343,402 | 3/1944 | Clifford | 29/890.043 |
| 2,976,907 | 3/1961 | Harvey et al. | |
| 4,347,966 | 9/1982 | Feutrel | 29/890.043 |
| 4,614,231 | 9/1986 | Proctor et al. | 168/153 |
| 5,082,051 | 1/1992 | Ando | 165/153 |

Primary Examiner—A. Michael Chambers
Attorney, Agent, or Firm—Kenneth H. MacLean

[57] ABSTRACT

This invention concerns a plate type heat exchanger and more particularly a heat exchanger having aluminum plates in which edge portions of two plates are uniformly and securely clamped together with an aluminum clamp ring which is positioned adjacent an inlet/outlet fitting portion prior to furnace brazing the contacting plate edges. The clamp ring is made to contract about the outer surfaces of the plates by the application of electromagnetic energy.

8 Claims, 2 Drawing Sheets

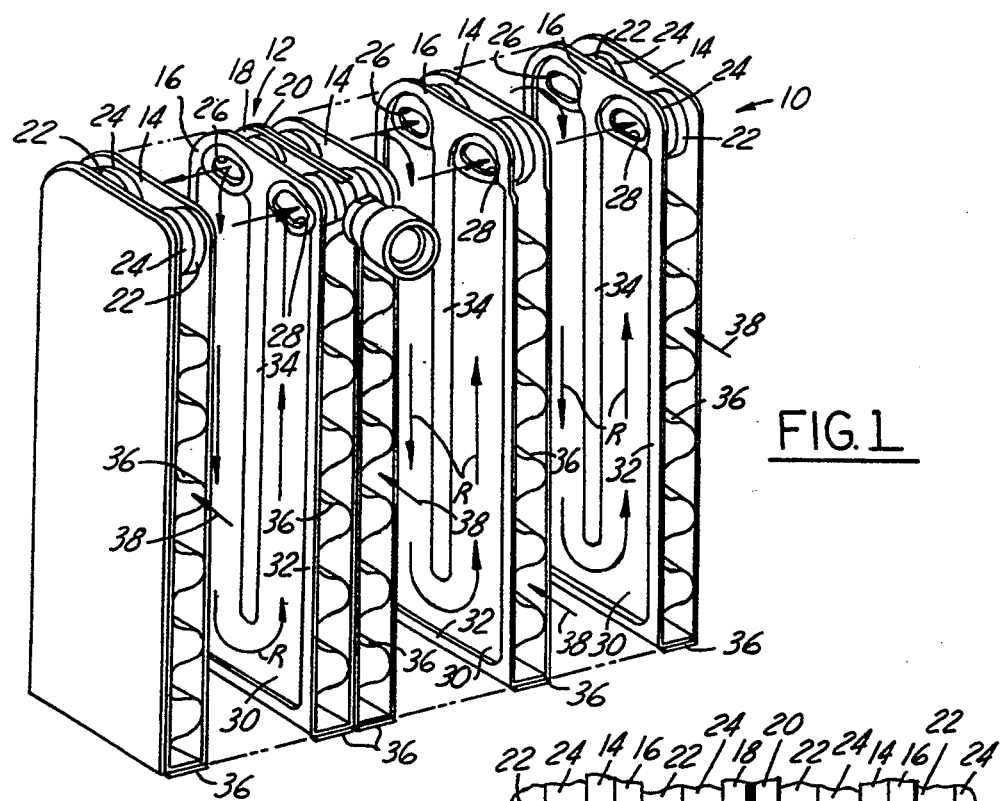
FIG. 1
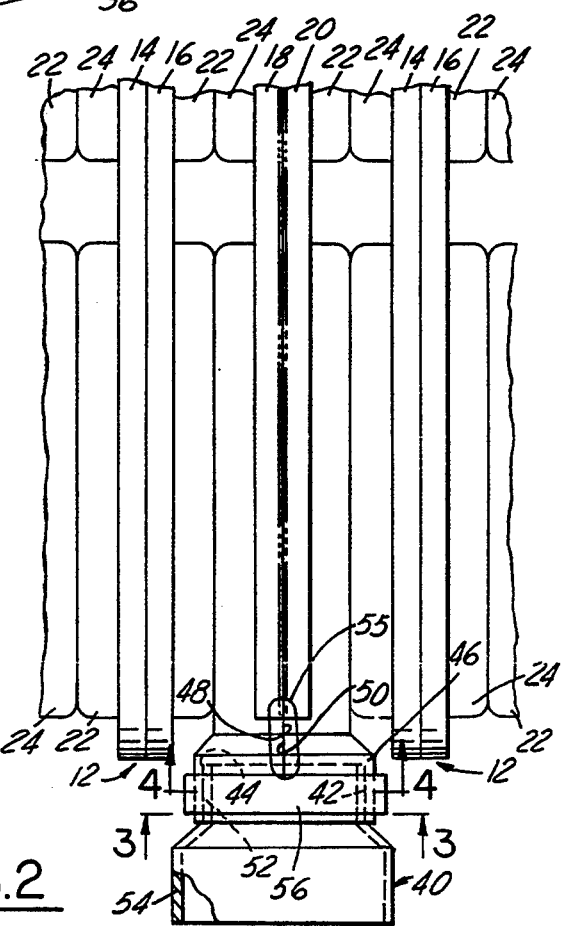
FIG. 3
FIG. 2

CLAMPING APPARATUS AND METHOD FOR HEAT EXCHANGER PLATES

BACKGROUND OF THE INVENTION

1. Field of the Invention

A plate type heat exchanger is commonly used for several applications and is particularly useful for an automobile air conditioning evaporator. The evaporator's fluid passages are formed between thin aluminum sheets with edge portions attached together. The evaporator is characterized for lightness, a good heat exchange rate, and relatively low cost. The subject application concerns an apparatus and method to tightly clamp plates together prior to furnace brazing.

2. Description of Related Art

The basic structure of a typical plate type evaporator is well known. Also, such evaporators have previously been manufactured by furnace brazing. In the subject heat exchanger, a relatively thick inlet fitting is brazed into a circular opening formed by relatively thin semi-cylindrical plate portions. Potential gaps between mating semi-cylindrical portions and the inlet fitting can be a potential leak source. This application provides a permanent clamping apparatus and method of applying the clamp so that a subsequent furnace brazing effectively joins the portions and eliminates leakage paths.

A pre-examination search uncovered two patents as follows: U.S. Pat. No. 979,737 to Bernhard disclosing a clamp for heat exchanger sections and using a rod and a movable abutment structure; and U.S. Pat. No. 5,082,051 to Ando disclosing a heat exchanger of the tube and header type.

SUMMARY OF THE INVENTION

Inasmuch as the plate type evaporator provides for flow of fluid (refrigerant) therethrough, an inlet conduit or pipe is connected to the evaporator. In this regard, it has been found that in certain evaporator designs difficulties can be encountered in providing sufficient space for routing the inlet conduit. In some vehicle applications, the refrigerant inlet requires a relatively long conduit to connect with the upstream air conditioning system component. In certain vehicles, it would be advantageous to locate the inlet internal to the fluid passages or tubes for packaging reasons. Since the plates of the evaporator are generally quite thin and the inlet conduit is relatively thick and rigid, an inlet fitting is used between the plates and the conduit. Furnace brazing the inlet fitting to the plates requires that these parts be tightly drawn together to eliminate any potential leakage gaps which the brazing operation would be unable to fill.

Accordingly, objects and advantages of the present invention are: to provide a new and improved clamping apparatus for plates of the evaporator; to provide a new and improved clamping for evaporator plates in which the clamp is a ring of material suitable for brazing which permanently remains with the evaporator after furnace brazing the plates to one another; to provide a new and improved clamping for evaporator plates in which the clamp is a solid ring of braze compatible material configured to be easily slipped around the portions of the evaporator and the inlet fitting and then being radially constricted by the application of pulsed electromagnetic energy to tightly clamp the parts together.

The above and other objects and advantages are realized in accordance with the invention. A more complete understanding the present invention will be apparent from the following detailed description when taken with the drawings in which:

BRIEF DESCRIPTION OF THE DRAWINGS

FIG. 1 is perspective view of an evaporator with refrigerant passages or tubes formed by pairs of plates and showing an inlet fitting at a midposition; and FIG. 2 is an enlarged top planar view of the portion of the evaporator near the inlet fitting and showing a clamping ring formed about the plates and the inlet fitting; and FIG. 3 is an enlarged elevational front view of the same portion of the evaporator as in FIG. 2 with a broken away partial sectional view taken along section line 3—3 in FIG. 2 and looking in the direction of the arrows.

DETAILED DESCRIPTION OF THE PREFERRED EMBODIMENT

Figure 4:
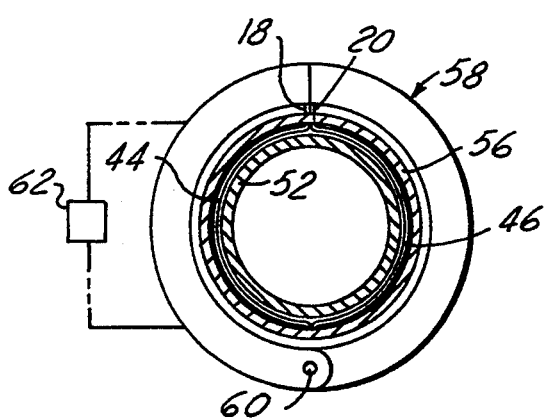
FIG. 4 is a sectioned view of the inlet portion of the heat exchanger taken along section line 4—4 in FIG. 2 and looking in the direction of the arrows but before the clamping ring is constricted radially inward against the heat exchanger components and also showing electromagnetic generating components somewhat schematically for constricting the clamping ring.

A plate type heat exchanger 10 according to the present invention is illustrated in the drawings. Specifically, the heat exchanger 10 is the type that is particularly useful as an evaporator in an automotive air conditioning system.

Evaporator 10 has a plurality of fluid passages or tubes 12 for directing the flow of a fluid such as refrigerant. Each tube 12 is formed between a pair of thin, and generally planar aluminum plates 14, 16. The plates of the evaporator 10 are identical to one another except for two special end plates (only one shown in FIG. 1) and except for two special plates 18, 20 with upper end portions configured to form an inlet for refrigerant.

As illustrated in the drawings, the upper portions of each plate 14, 16 has a pair of oval protuberances 22 and 24 positioned in a side by side relationship to one another. The protuberances 22 and 24 are struck outwardly or offset from the normal plane of the plate. Oval openings 26 and 28 are formed in protuberances 22, 24. When several fluid tubes 12 are positioned in spaced side by side relationship to one another with a protuberance 22, 24 engaging a neighboring protuberance 24, 22 respectively, the openings 26, 28 are aligned with openings 28, 26 in the neighboring protuberance. Thus, the fluid tubes 12 are fluidly coupled together at their upper ends through the openings. Further, the series of interconnected protuberances across the upper end of each of the fluid tubes 12 define a pair of side by side tanks. This serves to distribute the refrigerant to the interior spaces formed in the tubes 12.

Adjacent to and beneath the upper configuration, each of the plates 14, 16 has an central portion 30 which is raised or offset from the normal plane. Edge portions 32 border the central raised portion 30. When two plates are mated together to form a tube 12, these edge portions 32 engage one another and are furnace brazed together. This encloses the interior formed between the pair of plates which serves as a refrigerant flow passage. A divider rib 34 formed in the central portion of each plate running from the upper end portion toward the lower end portion. The engagement of the first plate's divider rib with the second plate's divider rib creates a flow path for refrigerant, first downward along one side of the divider rib 34 and then upward along the other side of the divider rib, to define a generally U-shaped flow pattern identified by label R in FIG. 1.

As is commonly known in the evaporator art and thus not shown in the drawings, each plate's central portion 30 can have a pattern of either inwardly extending dimples or short embossed ribs formed therein. When two plates are assembled together to form a fluid tube and subsequently brazed together, these dimples and/or embossed ribs are connected at interfacing contract points to increase the tube's mechanical strength and to create a serpentine flow path through each tube. Resultantly, heat transfer between the refrigerant and air flowing over the exterior of the plates and through the evaporator is increased.

The basic structure of the evaporator 10 is formed by arranging a plurality of fluid tubes 12 in a side by side relationship. As previously mentioned, the edge portions 32 of each pair of plates engage and are adapted to be joined together. Also, the plurality of fluid tubes 12 are spaced from one another and attached together at their upper ends by engagement together of the protuberances 22, 24. This configuration of the protuberances 22, 24 and the offset between the plate edges and the raised central portion define a plurality of spaces formed between adjacent fluid tubes 12. This spacing permits a flow 38 of air over the external surfaces of the plates. Corrugated cooling fins 36 are placed in these spaces to increase the heat transfer rate. As a fan or blower (not shown) passes air through the evaporator, heat energy is transferred from the air to the refrigerant which cools the air and causes the refrigerant to boil and vaporize within the tubes 12. The refrigerant is then discharged from the fluid tubes 12 via an outlet (not shown) which can be located in one of the end plates.

As shown in FIG. 1, evaporator 10 has a tubular inlet fitting 40 with a midposition location between its end portions. The special plates 18 and 20 are similar to plates 14, 16 but with differently configured upper end portions. These define a circular opening 42 when a pair of plates 18, 20 are mated together. As best shown in FIG. 2, an end portion of the inlet fitting 40 is inserted into the circular opening 42 which is formed by the mating of a semi-circular portion 44 of plate 18 with a semi-circular portion 46 of plate 20. The edges 48, 50 of portions 44, 46 are in an abutting relationship prior to being joined together by a furnace brazing operation.

In the preferred embodiment shown in the drawings, the inlet fitting 40 has a smaller, inner cylindrical portion 52 adapted to be inserted into the circular opening 42. The fitting 40 radially expands into an outer, larger diameter end portion 54. The outer portion 54 is sized to receive an end of an inlet conduit (not shown) which supplies refrigerant to the tubes of the evaporator from an associated condenser (also not shown). The outlet fitting 40 has a thickness of 0.058 inches while the plates 18, and 20 have a thickness of 0.020 inches. These plates are designed to be only thick enough to contain refrigerant at a working pressure but thin enough to minimize weight and maximize the extent of the space between the fluid tubes 12 for air to flow. The inlet fitting, however, must support an end of a relatively thick and long inlet conduit. Therefore, it must be more rigid than the plates. Because of these different thicknesses, inlet fitting 40 is interposed between the conduit and the plate structure.

In manufacturing the evaporator by furnace brazing, it is difficult to braze together complicated shapes such as in the plate type evaporator without leaving at least one gap through which refrigerant could leak. These gaps have to be filled by a costly hand brazing operation. Brazing the evaporator is possible only when surfaces such as edge surfaces 32 are very close together. It is particularly difficult to consistently form edges brazes such as between the edges 48 and 50.

During the brazing operation in the furnace, a compressive force is imposed on the evaporator to press the various plates 14, 16, 18, 20 and fins 38 together. To eliminate a potential gap formation in the circled area labeled 55 in FIG. 2, it has been found necessary to locally clamp semi-cylindrical portions 44, 46 together around the inlet fitting 40. A clamping member or band 56 has been found to effectively clamp the portions 44, 46 together as illustrated in FIGS. 2 and 3. It is desirable to clamp with something that remains a part of the evaporator after brazing. Thus, the clamp band 56 is made of aluminum as are plates 18 and 20.

For ease of assembling the evaporator, the clamp band 56 is sized so that it can be easily inserted around the semi-cylindrical portions 44, 46 as shown in FIG. 4. Prior to the furnace brazing operation, band 56 is constricted or shrunk around the portions 44, 46, and 52 to produce a tight fit of the semi-cylindrical portions 44, 46 against the inlet fitting 52. The band 56 is constricted by using a pulsed electromagnetic energy. The basic procedure of joining two members by this means has been previously used in other dissimilar applications such as the manufacture shock absorbers. The basic apparatus and the process are available commercially from Maxwell Laboratories, Inc. of San Diego, Calif. The technology falls under their trademark "Magneform."

Figure 5:
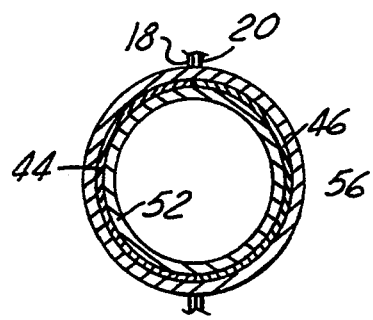
FIG. 5 is a sectioned view taken along section line 5—5 in FIG. 2 and looking in the direction of the arrows of the clamping ring and the inlet forming portions of the evaporator after constriction on the clamping ring.

This application is for the employment of pulsed electromagnetic energy to accomplish a manufacturing clamping assembly operation in the manufacture of plate type evaporators. More specifically, a coil assembly 58 is placed in encircling relationship to a clamping band 56 which in turn encircles portions 44, 46, and 52. As shown in FIG. 5, coil assembly 58 is illustrated in a somewhat schematic manner. It includes a hinging portion formed about a pin 60 so that the coil can be placed about clamp band 56. The coil is positioned relatively close to the outer surface of band 56. In the preferred arrangement, the difference between the radius of the inner surface of the coil and the radius of the outer surface of clamp band 56 is 0.010 inches. To prevent crushing of the plate walls by the contraction of the clamp band 56, a solid mandrel is inserted into the opening formed by the small end of the inlet fitting. The coil is connected electrically to a control device 62 (identified below). An application of pulsed current is sent through coil 58 which generates a pulsed electromagnetic field. The suddenly generated electromagnetic field produces internal currents through the clamp band 56. A strong repulsion force is generated which causes the band to be constricted in the radial direction. Thus, it moves inward about and against evaporator portions 44, 46, 52. Next, the mandrel is removed and the evaporator is placed into the brazing furnace. Resultantly, the portions 44, 46, and 52 are tightly clamped together. Any significant gaps are eliminated. This tightly clamped structure is shown in FIG. 5.

The previously mentioned control device 62 which is used to generate the strong electromagnetic field is available from Maxwell Laboratories and identified as a MAGNEFORM 7000 Series machine. Also, Maxwell Laboratories, Inc. claims ownership of U.S. Pat. Nos. 2,976,907; 3,247,040; and 3,383,890 as well as pending applications.

It should be noted that the clamp member to which an electromagnetic force is applied does not have to be a magnetic material such as iron. Aluminum, is effected by the pulsed electromagnetic field and is radially constricted or shrunk in response to application of the pulsed field.

Various changes and modifications can be made in the above described construction without departing from the spirit of the invention. Such changes and modifications are contemplated by the inventor and they do not wish to be limited except by the scope of the appended claims.

I claim:

1. In the manufacture of a plate type heat exchanger having fluid tubes with an interior flow space formed between pairs of metal plates, each of the pair of plates having contacting edge portions, a fluid inlet tube with a pair of plates defining semi-cylindrical portions which when mated together have abutting edges and define an inlet aperture, a tubular inlet member with an end portion inserted into the inlet aperture, and permanent clamp means for the semi-cylindrical portions in the form of a radially constricted metal annulus of braze compatible material positioned around the semi-cylindrical portions and the inlet end portion, the constriction of the annulus pressing the semi-cylindrical portions and against the end portion of the inlet member to positively engage the edges of the semi-cylindrical portions and eliminate gaps which would not be filled in a subsequent furnace brazing operation, a method of constricting the annulus, comprising: positioning a relatively loose annulus around the mated semi-circular portions and the end portion of the inlet member; applying sufficient electromagnetic energy in close proximity to the annulus to cause the annulus to radially constrict about the semi-circular portions whereby the edge portions are engaged and gaps which braze filler would not fill are eliminated.

2. The method of constricting an annulus about the semi-cylindrical portions and the inlet end portion as set forth in claim 1 in which a coil is located closely about the annulus and a pulsed electrical current charge is passed though the coil of sufficient density to generate a large electromagnetic field about the annulus and thereby generate a current flow through the annulus which is repulsed by the electromagnetic field to cause an inward constriction of the annulus in a radial direction.

3. A heat exchanger characterized by a at least one fluid tube, the tube being formed by a pair of mated plate members with edge portions joined together and with midportions spaced apart to define a fluid passage therebetween, the plates defining semi-cylindrical portions which create a tubular inlet aperture when edge portions are engaged, fluid supply means including a tubular portion inserted into the tubular inlet aperture, means to permanently clamp the edge portions of the semi-cylindrical portions together in the form of an annulus of braze compatible material placed around the semi-cylindrical portions; the annulus being initially sized to permit ready insertion over the semi-cylindrical portions and subsequently being radially constricted to tightly clamp the semi-cylindrical portions about the tubular portion of the fluid supply means and bring the edge portions of semi-cylindrical portions into engagement so that in a subsequent furnace brazing the semi-cylindrical portions and the tubular portion of the fluid supply means are joined in a non-leaking manner.

4. In a heat exchanger of the type having a plurality of fluid tubes formed by pairs of plate members having their edge portions attached together to form fluid flow passages therebetween for a first fluid, the fluid tubes being positioned in a side by side relation to one another with spaces formed therebetween to allow a second fluid to the flow therebetween and over the exterior surfaces of the plates, one of the fluid tubes having plates with semi-cylindrical portions which mate together to form a circular inlet aperture to the interior of the fluid tube for the first fluid, a tubular inlet fitting adapted to be inserted into the circular inlet aperture: means for permanently clamping the semi-cylindrical portions together in the form of a annulus of braze compatible material located around the semi-cylindrical portions; the pre-assembly sizing of the annulus permitting a relatively loose initial fit about the semi-cylindrical portions; the annulus being radially constricted to clamp the semi-cylindrical portions and the inlet fitting together so that any significantly sized gaps which brazing would not fill are eliminated.

5. The heat exchanger set forth in either of claims 3 and 4 in which the plates and annulus are both of material such as aluminum which can be furnace brazed.

6. The heat exchanger set forth in claim 4 in which the annulus is radially constricted around the semi-cylindrical portions by the application of electromagnetic energy.

7. The heat exchanger set forth in claim 6 in which the fluid supply means includes a relatively thick tubular inlet fitting with an end portion inserted into the inlet aperture formed by the semi-cylindrical portions.

8. The heat exchanger set forth in claim 7 in which the plates have a thickness of about 0.020 inches and the tubular inlet fitting has a thickness of about 0.058 inches.

* * * * *